Figure 1:
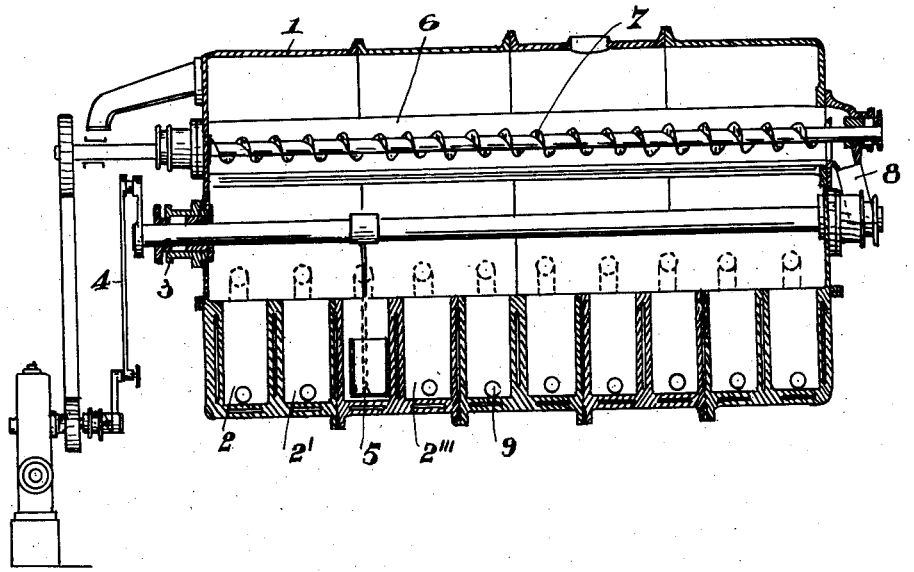

M. PRAGER.
APPARATUS FOR CONCENTRATING, DRYING, AND CRYSTALLIZING.
APPLICATION FILED NOV. 22, 1912.

1,062,030.

Patented May 20, 1913.

Witnesses
Frank H. Logan
Alfred R. Anderson

Inventor
Moritz Prager
By H. van Dedemel
Attorney

UNITED STATES PATENT OFFICE.

MORITZ PRAGER, OF BERLIN, GERMANY.

APPARATUS FOR CONCENTRATING, DRYING, AND CRYSTALLIZING.

1,062,030.  Specification of Letters Patent. Patented May 20, 1913.

Application filed November 22, 1912. Serial No. 732,999.

*To all whom it may concern:*

Be it known that I, MORITZ PRAGER, subject of the German Emperor, residing at Berlin, Germany, have invented a new and useful Apparatus for Concentrating, Drying, and Crystallizing; and I do hereby declare the following to be a full, clear, and exact description of the same.

This invention is an improvement in or modification of that set forth in my application, Serial Number 732998, filed Nov. 22, 1912, for Letters Patent in the United States of America, in which is described an apparatus for concentrating drying or crystallizing in stages, in which in a casing provided with a concentric stirring spindle, are provided several chambers arranged side by side, into which the material to be treated is introduced, treated by the stirring blades provided on the stirring spindle and conveyed by means of scooping blades mounted on the said spindle, from one chamber into the next. There are, however, cases in which it is not necessary to effect concentration, drying or crystallizing in stages, but the material treated can be finished in a single operation, for instance when it is desired to treat lyes strongly precipitating salts, or of easily drying materials, easily concentrated liquids and the like. The apparatus according to the above specification, is not suitable for such cases in practice, owing to the necessity of the passage of the material through single chambers arranged side by side.

The present invention relates to a further development of an apparatus described in the said specification, in such a manner that the casing subdivided in its lower part into a series of chambers arranged side by side, and provided with the concentric spindle carrying scooping blades, is still retained, but the material is no longer conveyed from one chamber to the next by the scooping blades, but the latter are arranged so that each receives the precipitated, dried or concentrated product contained in its chamber, and conveys it to a discharge conduit arranged above the stirring spindle and provided with worm conveyers.

The advantages of the apparatus over a single drum receiving the whole of the material to be treated consist in the sub-divided chambers treating at any time comparatively small quantities of the material independently, for instance, mixing and stirring it, so that a large area of treatment is obtained, without the apparatus becoming in any way more complicated than in the case of a single working chamber, and without the working operation being in any way retarded thereby. Moreover, owing to the subdivision of the casing into several chambers arranged side by side in the lower half, and owing to the scooping blades adjoining closely the walls of the chambers, the chambers receiving only a comparatively small quantity of material, are completely cleaned during the repeated passage of the blades, so that a permanent settling of concentrated, crystallized or dried material on the chamber walls is impossible. Finally, the single chambers could also be heated to a different degree, so that each chamber could supply a product of different concentration and of different degree of drying. This is essential when for instance, it is not desired to utilize the whole apparatus but only to treat comparatively small quantities of material, and when at the same time it is necessary to work with different speeds or with different temperatures.

Figure 2:
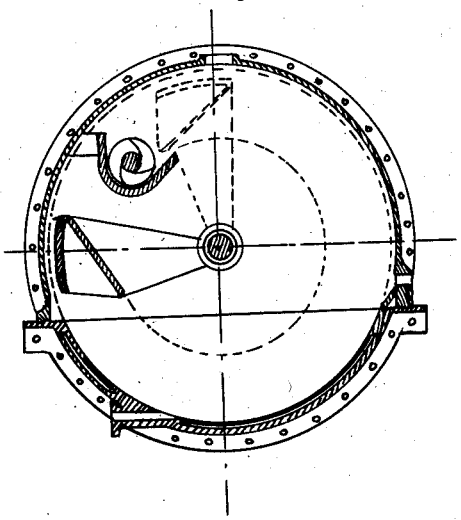

A construction according to this invention is illustrated by way of example in the accompanying drawing, in which:

Figure 1 shows it in longitudinal section, Fig. 2 being a cross-section of the casing.

The casing 1 which may work with a vacuum is sub-divided in the lower part into several adjoining chambers 2, 2', etc. These chambers are preferably made with double walls, the space between the double walls being used as a heating chamber. It will be seen that, owing to this division of the casing into several adjoining chambers, comparatively small single chambers with large heating surface are provided for the treatment so that the efficiency of the apparatus as regards the material discharged is considerably increased.

In the casing 1 is concentrically mounted a spindle 3 which can be driven from an oscillating lever gear 4, and is provided with ladle-like blades 5, one blade for each chamber, the walls of which closely adjoin the walls of the single chambers 2, 2', etc. When the spindle is driven, the said blades pass through the chambers 2, sliding close to the walls of the same, and take up the solid material contained in the chambers, for instance the precipitated salt, the material deprived of water, dried or concentrated, and discharge it at a suitable rotation in vertical or practically vertical position into a discharge conduit 6, in which is working a worm conveyer 7 which carries the material to the outlet funnel 8. The openings for the lye deprived of salt are marked 9, and those for supplying the lye to be treated, the liquid to be concentrated or the material to be dried, are marked 10. The spindle can be oscillated in such a manner that between each two consecutive oscillations, there will be a certain adjustable period of time, for instance, adjustable by the adjustment of a suitable gear controlled by a cam groove, but not shown here, as it is assumed to be well known.

If the movement of the spindle to about 270° were to make it difficult to arrange the stirring blades on the same, and in so far as the stirring of the material to be introduced is considered desirable, a separate stirring device could be provided, for instance consisting of a drum, the said rods being driven from an eccentric spindle situated outside the drum. It is moreover advisable to make the discharge conduit capable of being separately heated, in order to enable subsequent drying or concentration to be carried out therein.

Having now fully described the nature of my invention and in what manner the same is to be performed, I declare that what I claim and desire to secure by Letters Patent is:—

1. In an apparatus for concentrating, drying, and crystallizing, a casing, transverse partitions forming chambers in the lower part thereof, a spindle rotating in said casing, scooping blades thereon, a discharge trough into which the scooping blades discharge the material, whereby the material in each chamber is treated independently.

2. In an apparatus for concentrating, drying and crystallizing, a casing, transverse partitions forming chambers in the lower part thereof, a spindle rotating in said casing, scooping blades thereon, a discharge trough into which the scooping blades discharge the material, and a conveyer in said groove, whereby the material in each chamber is treated independently.

3. In an apparatus for concentrating, drying and crystallizing, a casing, transverse partitions forming chambers in the lower part thereof, a spindle rotating in said casing, scooping blades thereon adapted to pass very close to the walls of the chambers, a discharge trough, arranged above said spindle, into which the scooping blades discharge the material, whereby the material in each chamber is treated independently.

In testimony whereof, I have signed my name to this specification in the presence of two subscribing witnesses.

MORITZ PRAGER.

Witnesses:
 WOLDEMAR HAUPT,
 HENRY HASPER.